(12) United States Patent
Kulshrestha et al.

(10) Patent No.: US 12,718,607 B2
(45) Date of Patent: Aug. 25, 2026

(54) SYSTEM AND METHOD FOR IDENTIFYING THE EDUCATIONAL CONTENT USING ARTIFICIAL INTELLIGENCE

(71) Applicant: Extramarks Education India Pvt Ltd., Noida (IN)

(72) Inventors: Ritvik Kulshrestha, Noida (IN); Tanay Karve, Noida (IN); Deep Dwivedi, Noida (IN); Abhra Das, Noida (IN); Suman Gadhawal, Noida (IN); Vipin Tripathi, Noida (IN); Gaurav Sharma, Noida (IN)

(73) Assignee: EXTRAMARKS EDUCATION INDIA PVT LTD., Noida (IN)

( * ) Notice: Subject to any disclaimer, the term of this patent is extended or adjusted under 35 U.S.C. 154(b) by 302 days.

(21) Appl. No.: 17/623,186

(22) PCT Filed: Oct. 28, 2021

(86) PCT No.: PCT/IB2021/059978
§ 371 (c)(1),
(2) Date: Dec. 27, 2021

(87) PCT Pub. No.: WO2023/073407
PCT Pub. Date: May 4, 2023

(65) Prior Publication Data

US 2026/0148578 A1 May 28, 2026

(51) Int. Cl.
*G06K 9/00* (2022.01)
*G06N 3/0464* (2023.01)
(Continued)

(52) U.S. Cl.
CPC .......... *G06V 30/18* (2022.01); *G06N 3/0464* (2023.01); *G06N 3/086* (2013.01)

(58) Field of Classification Search
USPC ........ 382/100, 103, 112–114, 116, 123, 137, 382/156, 168, 173, 181, 187, 254, 305,
(Continued)

(56) References Cited

U.S. PATENT DOCUMENTS 8,473,911 B1 * 6/2013 Baxter ...................... G06F 8/73 717/136
8,891,822 B2 * 11/2014 Jain .................... G06V 30/2445 348/222.1

(Continued)

*Primary Examiner* — Seyed H Azarian
(74) *Attorney, Agent, or Firm* — Kilpatrick Townsend & Stockton LLP

(57) ABSTRACT

The present disclosure provides a system and a method for authoring and automatically digitizing the printed and well as handwritten educational content inside an input image with a plurality of input characters. The method comprises the steps of receiving and processing an input image by a pre-processing module to identify and obtain a plurality of input characters from the input image, digitizing the plurality of input characters into the output string representations by a digitizing module, combining the plurality of output string representations using a post-processing module which is outputted in a computer-readable format, delineative text, and a markup language. Further, the system is based on the Convolution Neural Network (CNN) that may provide an embedded editing module allowing one or more users to make corrections and create new content. The CNN system may be retrained iteratively based on the editing performed by the users on the output strings representations to ensure high accuracy, better performance, and to avoid/reduce the error rate.

12 Claims, 8 Drawing Sheets

(51) Int. Cl.
*G06N 3/086* (2023.01)
*G06V 30/18* (2022.01)

(58) Field of Classification Search
USPC .......... 382/312; 348/222.1; 706/25; 717/136
See application file for complete search history.

(56) References Cited

U.S. PATENT DOCUMENTS

| | | | | |
|---|---|---|---|---|
| 10,949,664 | B2 * | 3/2021 | Su | G06N 3/084 |
| 12,430,072 | B2 * | 9/2025 | Bazarsky | G06N 3/0464 |
| 2017/0337423 | A1 * | 11/2017 | Chen | G06V 30/274 |
| 2018/0096619 | A1 * | 4/2018 | Fuka | G09B 7/02 |
| 2023/0214661 | A1 * | 7/2023 | Perdikaris | G06N 3/045<br>706/25 |

* cited by examiner

SYSTEM AND METHOD FOR IDENTIFYING THE EDUCATIONAL CONTENT USING ARTIFICIAL INTELLIGENCE

CROSS-REFERENCE TO RELATED APPLICATIONS

This application is a 371 U.S. National Phase Application of International Patent Application No. PCT/IB2021/059978, filed Oct. 28, 2021, which is herein incorporated by reference in its entirety for all purposes.

TECHNICAL FIELD OF THE DISCLOSURE

The present disclosure relates to a system and a method for identifying educational content through an Artificial Intelligence-based process, more specifically related to Convolutional Neural Network (CNN) related processes for digitising educational content and/or documents.

BACKGROUND

The process of digitising documents manually is an onerous task and inefficient in terms of both quality and speed. A lot of user-created content like notes, questions, answers, and teaching material from the domains of physics, mathematics, and chemistry include symbolic text like equations, figures, and other complex data which is not possible to represent using normal ASCII text. However, a vast number of such documents remain in the form of images or non-editable PDFs. Because of this, persisting such documents digitally not only becomes a resource-intensive task but also disarranges educational content author/user experience. Consequently, academicians creating the educational content end up using authoring software's such as Microsoft Word or Microsoft Excel or any other of a similar kind. However, such authoring software's are incompatible with various online education platforms, therefore do not provide simplicity and ease of usage to the users.

Usually, the conversion of image to text is performed using the Optical Character Recognition (OCR) systems, however, due to the *variegates* styles and the composite nature of the content such as the mathematical equations, the existing OCR systems require significant computational resources. Further, OCR uses various sequential steps for conversion leading to potential errors such as information loss and/or distortion. The OCR systems utilise image binarization and segmentation steps for locating characters or symbols. However, the OCR processes may yield erroneous predictions that may not be subsequently corrected, especially when the steps are performed sequentially. Further, the sequential nature of the OCR systems is a time-demanding process and utilises significant computational costs.

Moving further, the existing authoring tools like 'Math-Author' is designed to author content for web interfaces allowing the generated content to be indexed and displayed inside a web browser. However, due to the deficiencies such as content augmentation and templatization, it becomes cumbersome for academicians to create new content and/or to digitize historical content, thus spending time and resources for such redundant work. Further, mathematical equation identification in a PDF document can be challenging due to page layout, token labels, location of characters, sizes of font, etc. Essentially, it becomes an arduous task to write a rule-based engine for the variegated types of mathematical formulae and chemical equations, thereby limiting the performance and scope of the equation detector. Furthermore, the extraction of content data contained especially in the image region of complex content such as chemical structures and physics circuit diagrams is a tedious process. Therefore, there exists a need for authoring systems and related methods that may automatically digitize the printed and/or handwritten documents including a plurality of characters such as mathematical equations, chemical equations, chemical structures, or hand-drawn circuit diagrams, and the like in a textual or markup format which might result in the reduction of error and eventually saving the time and resources used for such an activity.

SUMMARY

The present disclosure aims at solving the problems described above.

The present disclosure discloses a system and a method for authoring and automatically digitizing the printed and handwritten content included in an input image with a plurality of input characters. The system may include an input module consisting of the input image including the plurality of input characters. The system may further include a pre-processing module that may be operable to identify the received input image and may extract the plurality of input characters from the said image. Further, the system may include a digitizing module that may be operable to digitize the plurality of input characters into a plurality of output string representations. Furthermore, the system may include a post-processing module that may be operable to combine the plurality of output string representations in accordance with a computer-readable format, delineative text, or a markup language. Additionally, the system may include an embedded editing module that may be operable to allow one or more users to make corrections in the plurality of output string representations. The embedded editing module may allow one or more users to create new educational content such as mathematical expressions, diagrams, chemical equations, and the like. Further, for creating and editing the educational content, the embedded editing module may include virtual keyboard for mathematical expressions and chemical equations. The system may further include an output module that may present a digitised document constituting the plurality of output string representations.

The digitizing module may digitize the plurality of input characters including, but not limited to, mathematical expressions, chemical equations, complex chemical structures, and physics circuit diagrams into the plurality of output string representations such as MathML sequences, LaTeX sequences, string-based self-referencing functions, and netlist sequences respectively, and the like.

In an embodiment, the present disclosure relates to a method of authoring and automatically digitizing the plurality of input characters into the plurality of output string representations. The method may be based on CNN and may digitize printed and handwritten input characters such as a mathematical expression, a chemical equation, a complex chemical structure, or a physics circuit diagrams. Further, the method may be retrained iteratively based on the editing performed by one or more users on the output string representations. The method further may comprise the generation of one or more new questions given a single question using a question templatization module. Furthermore, the iterative retraining based on the editing performed by one or more users in the output string representations may be saved in a database and/or a memory device for a similar continual learning flow.

In another embodiment, the present disclosure may provide a visual attention mechanism, that may generate the output string representations by mapping sequences such as LaTeX sequences to one or more regions of the input image. One or more regions may be derived by generating a feature map from the input image that may be passed to an auto-encoder for predicting the sequence of LaTeX tokens. Further, the system may perform iterative retraining based on the editing performed by the one or more users on the output string representations that may continue for one in 2000 instances or less than or equal to a range of 0.01 percent to 0.05 percent until the incremental increase in the performance and reduction in the error rate. Because the system may be trained using CNN, the errors may be avoided and/or reduced. Further, the CNN may offer robustness against possible noise or distortions during processing. Based on the training performed, CNN may be flexible and adaptable to various types of data, symbols, languages, and characters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings are incorporated herein and form a part of the disclosure.

DETAILED DESCRIPTION OF THE DRAWINGS

Figure 1:
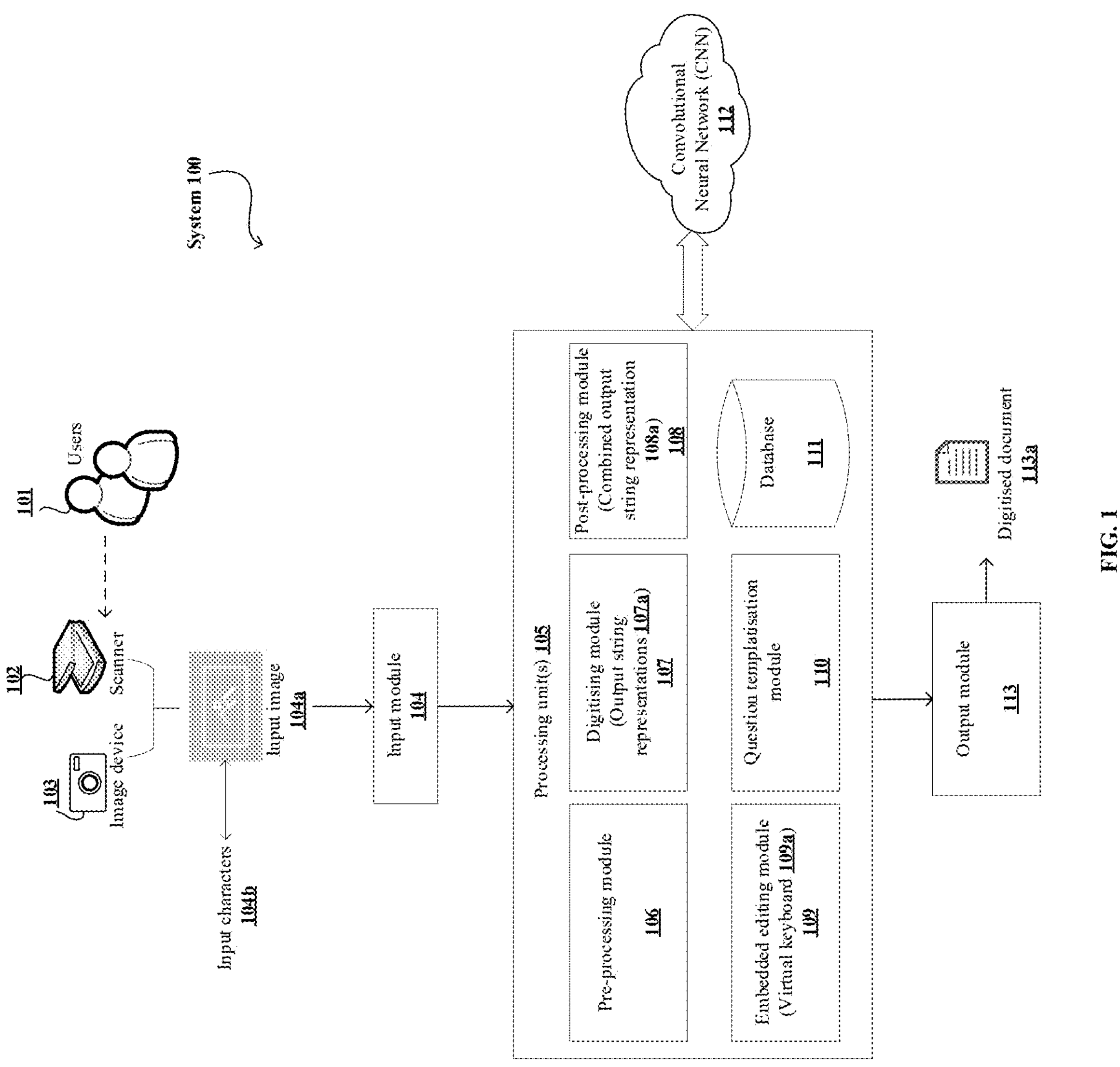
FIG. 1 depicts a system for identifying the educational content using Artificial Intelligence.

While the disclosure has been disclosed with reference to certain embodiments, it will be understood by those skilled in the art that various changes may be made, and equivalents may be substituted without departing from the scope of the disclosure. In addition, many modifications may be made to adapt to a particular situation or material to the teachings of the disclosure without departing from its scope.

Throughout the disclosure and claims, the following terms take the meanings explicitly associated herein unless the context clearly dictates otherwise. The meaning of "a", "an", and "the" include plural references. The meaning of "in" includes "in" and "on". Referring to the drawings, as numbers indicate like parts throughout the views. Additionally, a reference to the singular includes a reference to the plural unless otherwise stated or inconsistent with the disclosure herein.

The term "image" shall mean any type of digital data, which has a two-dimensional or three-dimensional representation. An image can be created by a camera or scanner, to display the image on a display of certain electronic devices.

The term "character" includes both a handwritten character and a printed character. In certain embodiments, the term "character" also refers to a character of a mathematical expression, chemical equation, complex chemical structure, physics circuit diagrams, or any other set of characters involving any scientific meaning.

The term "Convolution Neural Network" (CNN) refers to a deep learning algorithm that can take in an input image, assign importance (learnable weights and biases) to various aspects/objects in the image and be able to differentiate one from the other. CNN's are a branch of machine-learning methods and can be utilised to execute one or more operations during the process of optical character recognition according to the embodiments of the disclosure. In this disclosure, the term "convolutional neural network" can refer to a pre-trained neural network or neural network that is to be trained.

Various embodiments of these features will now be discussed with respect to the corresponding figures.

FIG. 1 illustrates an architecture of an Artificial Intelligence (AI) driven educational content system 100 with one or more embodiments of the present disclosure. The system 100 may comprise an input module 104 that may receive an input image 104*a* captured by one or more users 101 by utilising a scanner 102, an image device 103, or any other image acquisition device. The input image 104*a* may include one or more printed and handwritten input characters 104*b*. Further, the input image 104*a* may be captured sequentially by one or more users 101. The system 100 may further include a processing unit(s) 105 that may include various modules for identifying the input image 104*a*. Further, the input image 104*a* may be passed to a pre-processing module 106 to identify the received input image 104*a* and further extract text and/the plurality of input characters 104*b* from the input image 104*a*. The pre-processing module 106 may recognise text and/or the plurality of input characters 104*b* including, but not limited to, mathematical expressions, chemical equations, complex chemical structures, and physics circuit diagrams from the captured input image 104*a* by the one or more users 101. The input image 104*a* may be split into various input characters 104*b* corresponding to the text, mathematical expressions, chemical equations, complex chemical structures, and physics circuit diagrams. Further, the input image 104*a* may be fed to a digitizing module 107. The digitizing module 107 may be operable to digitize the plurality of input characters 104*b* into the respective output string representations 107*a*. The output string representations 107*a* received by the digitizing module 107 may be fed into a post-processing module 108 to further combine the plurality of output string representations 107*a* as per the sequential order received by the pre-processing module 106 and present them into a single and final combined output string representation 108*a*. The plurality of combined/stitched output string representations 108*a* may be then sent to an embedded editing module 109 allowing one or more users 101 to edit the digitised content and create and/or author new content. The embedded editing module 109 may allow one or more users 101 to create new educational content such as mathematical expressions, diagrams, chemical equations, and the like. Further, the system 100 may include a question templatization module 110 that may verify whether the output string representation 108*a* post-processed by the post-processing module 108 represents any type of question such as a mathematical question. The question templatization module 110 after verifying the presence of any question in the combined output string representations 108*a*, may semantically generate new questions related to the educational content such as mathematical expressions, chemical equations, etc. Furthermore, the system 100 may include a database and/or a memory device 111 that may store the digitised and the edited content by the digitising module 107 and the embedded editor module 109 respectively. The database 111 may further store new questions generated by the question templatization module 110. The output string representations 108*a* may therefore be processed by an output module 113 in the form of a digitised document 113*a* consisting of various recognised input characters 104*b*.

The database and/or a memory device 111 may be volatile memory (e.g., registers, cache, RAM), non-volatile memory (e.g., ROM, flash memory, etc.) or some combination of the two, accessible by the processing unit(s) 105. The memory stores system implementing one or more computer-executable instructions suitable for execution by the processing unit(s) 105. Further, the database and/or a memory device 111 can store output string representations 107*a* digitised by the digitising module 107 and edited by the embedded editor module 109, and various questions generated by the question templatization module 110.

Further, the system 100 may be trained using CNN 112. The CNN 112 may be pre-trained to recognise the sequential input characters 104*b* of the input image 104*a*. Further, the CNN 112 may be re-trained through an automatic sagemaker pipeline. The automatic sagemaker pipeline may be a fully-managed service that may enable the developers and data scientists to build, train and deploy machine learning techniques at any scale quickly and easily. Moreover, the sagemaker may allow one to decouple the storage of the dataset from the actual training execution and may run an entire development pipeline on the cloud, which may include data collection, creation, and quantization and deployment.

Thus, although not limited to such implementations, the present disclosure may utilize a machine learning training utility, such as Amazon Sagemaker, for instance, to train CNN 112. Therefore, the automatic sagemaker pipeline may perform an accuracy test on the global dataset stored in the database 111 to check for global improvements. Further, the system 100 based on CNN 112 may be retrained iteratively based on the editing performed by one or more users 101 on the output string representations 108*a* using the embedded editor module 109. The iterative retraining continues for one in 2000 instances or less than or equal to a range of 0.01 percent to 0.05 percent until the incremental increase in the performance and reduction in the error rate.

Figure 2:
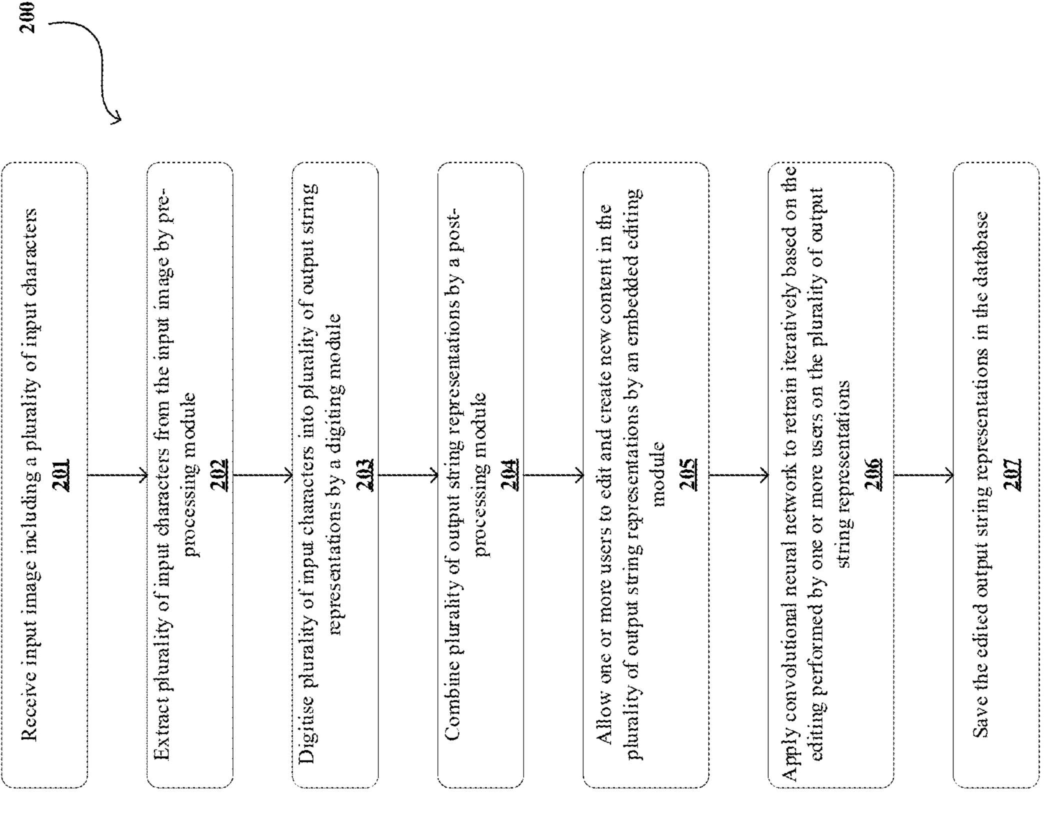
FIG. 2 depicts a simplified flow diagram of an embodiment of a method of identifying the educational content using Artificial Intelligence.

FIG. 2 is a simplified flow diagram 200 illustrating a method of identifying the educational content through an Artificial Intelligence-based process, more specifically related to CNN 112.

As illustrated in FIG. 2, the method 200 comprises one or more blocks implemented by the system 100 for identifying the educational content. The method 200 may be described in the general context of computer-executable instructions performed by various processing unit(s) 105. Generally, computer executable instructions can include procedures, modules, and functions, which perform functions or implement particular abstract data types.

The order in which the method 200 is described is not intended to be construed as a limitation, and any number of the described method blocks can be combined in any order to implement the method 200. Further, the method 200 can be implemented in any suitable software, firmware, or combination thereof.

The method may commence at step 201 with the input module 104 that may receive the input image 104*a* including the plurality of input characters 104*b*. In an embodiment, the input module 104 may receive the input image 104*a* captured by one or more users 101 by utilising the scanner 102, or the image device 103. At step 202, the pre-processing module 106 may extract the plurality of input characters 104*b* from the input image 104*a*. The pre-processing module 106 may recognise all the input characters 104*b* of the input image 104*a*. Further, the pre-processing module 106 may recognise and segregate different types of text and/or input characters 104*b* inside the input image 104*a*. The different types of input characters 104*b* may include, but not limited to, mathematical expressions, chemical equations, complex chemical structures, and physics circuit diagrams. The pre-processing module 106 may segregate different types of input characters 104*b* using an object detection algorithm. The object detection algorithm may detect the location of different types of text and/or input characters 104*b* inside the input image 104*a* by using a computer vision-based CNN 112. The object detection algorithm may further classify different types of text and/or input characters 104*b* inside the input image 104*a*. Furthermore, the pre-processing module 106 may recognise various vernacular languages including, but not limited, to English, Hindi, Gujarati, and all other spoken languages.

At step 203, the digitising module 107 may digitise plurality of input characters 104*b* into the plurality of output string representations 107*a*. In an embodiment, the digitising module 107 may digitise the plurality of input characters 104*b* into the respective output string representations 107*a* including, but not limited to text, mathematical expressions, chemical equations, complex chemical structures, and physics circuit diagrams. The digitizing module 107 may receive each of the input characters 104*b* as input and recognise the printed and handwritten text in the input image 104*a*. Further, the input characters 104*b* containing the mathematical expressions and chemical equations may be recognised by the digitising module 107 into a MathML and LaTeX sequence respectively. To this end, the complex chemical structures contained in the input characters 104*b* may be digitised by the digitising module 107 into a string-based self-referencing function also known as Self Referencing Embedded Strings (SELFIES). Additionally, the digitising module 107 may recognise the physics circuit diagrams into a netlist sequence.

At step 204, the post-processing module 108 may combine the plurality of output string representations 107*a*. In an embodiment, the post-processing module 108 may combine the plurality of output string representations 107*a* recognised by digitising module 107 into a single and final combined output string representation 108*a* in accordance with a computer-readable format or a markup language.

At step 205, the embedded editing module 109 may allow one or more users 101 to edit and create new content in the plurality of output string representations 108*a*. In an embodiment, the embedded editing module 109 may also be known as an inline WYSIWYG (What You See Is What You Get) editor. In an embodiment, the embedded editing module 109 may provide one or more users 101 with an easy way to edit the output string representations 108*a* received from the post-processing module 108 at step 204. For performing the editing task, the embedded editing module 109 may include a virtual keyboard 109*a* for mathematical expressions and chemical formulas. The virtual keyboard 109*a* may cover all the multifarious symbols and styles present inside the input image 104*a*. The output string representations 108*a* may be imported into the virtual keyboard 109*a*, and the virtual keyboard 109*a* may allow editing the output string representations 108*a* by one or more users 101 into the final edited MathML and LaTeX sequences. Further, the editing/corrections made by one or more users 101 on the plurality of output string representations 108*a* by the embedded editing module 109 may be saved in the database 111 for a continual learning flow.

At step 206, CNN 112 may be applied to retrain iteratively based on the editing performed by one or more users 101 on the plurality of output string representations 108*a*. In an embodiment, the system 100 based on CNN 112 may be retrained iteratively based on the editing history performed by one or more users 101 on the output string representations 108*a* using the embedded editor module 109. The system 100 may be retrained through an automatic sagemaker pipeline that may perform an accuracy test on the global dataset stored in the database 111. The automatic sagemaker pipeline may be used for large datasets for the particular machine learning models. Further, there may be a pipe mode in the automatic sagemaker pipeline that may stream training data directly from the database 111, which may include Amazon's cloud based storage. The automatic sagemaker pipeline may help automate different iterations performed on the global dataset stored in the database 111. Further, the iterative retraining may continue for one in 2000 instances or less than or equal to a range of 0.01 percent to 0.05 percent until the incremental increase in the performance and reduction in the error rate.

At step 207, the edited output string representations 108*a* may be saved in the database 111. In an embodiment, the database and/or a memory device 111 may include the plurality of output string representations 108*a* edited by the embedded editing module 109. The database 111 may also store the plurality of new questions generated by the question templatisation module 110.

Figure 3:
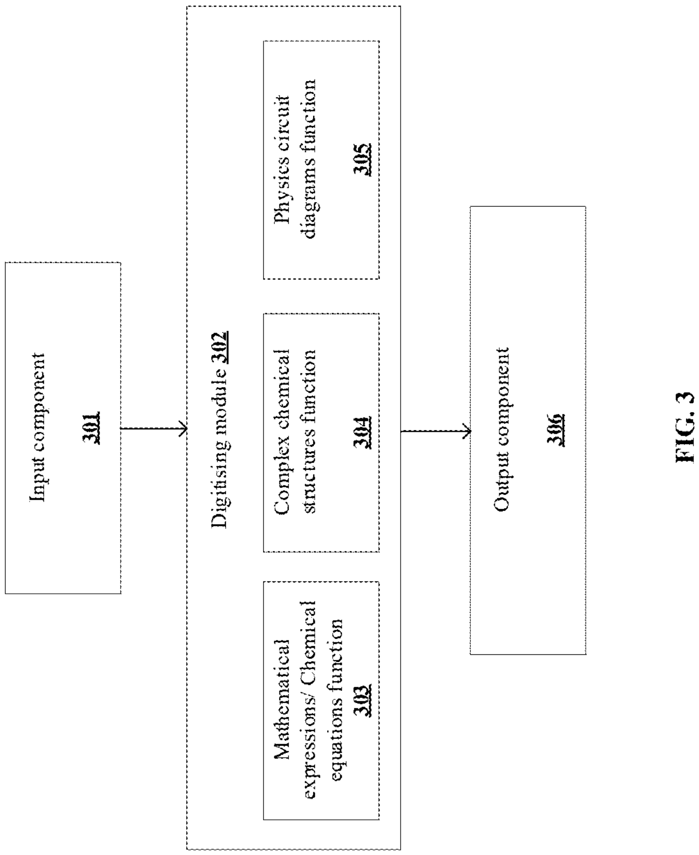
FIG. 3 depicts a digitising module utilised for digitising a plurality of input characters.

FIG. 3 illustrates a digitising module 302 utilised for digitising one or more input characters 104*b* inside the input image 104*a*. As illustrated, the digitising module 302 may receive the plurality of input characters 104*b*, including, but not limited to, mathematical expressions, chemical equations, complex chemical structures, and physics circuit diagrams from the input component 301. The digitising module 302 may include various functions including mathematical expressions/chemical equations function 303, complex chemical structure's function 304, and physics circuit diagram's function 305. Further, the digitising module 302 may output the plurality of digitised output string representation 107*a* into an output component 306. Furthermore, the digitising module 302 may include mathematical expressions/chemical equations function 303. The mathematical expression/chemical equation may be extracted by utilising an object detection algorithm known as Single Shot Detector (SSD). The SSD may only need to take one single shot to detect multiple objects within the input image 104*a*. Further, there may be two kinds of SSD object detection algorithm, i.e., SSD300 and SSD512. SSD300 may identify the input image 104*a* in lower resolution and SSD512 may identify the input image 104*a* in higher resolution. Therefore, SSD512 object detection algorithm may be utilised with a rail scanning approach to recognise the input image 104*a* including input characters 104*b* for mathematical expressions/chemical equations. The SSD512 object detection algorithm may generate a feature map which along with speeding up the training, may help the digitising module 302 to converge better on the input image 104*a* features. Further, the SSD512 object detection algorithm may be pre-trained on an ImageNet dataset using advanced computer vision and deep learning. The ImageNet dataset is an image database organised according to the WordNet hierarchy in which each node in the hierarchy is depicted by hundreds and thousands of images. The input characters 104*b* present inside the input image 104*a* may include various text lines. The SSD512 object detection algorithm with a rail scanning approach may consider the text lines inside the input image 104*a* as rails. Further, a sliding window may be used to slide over the entire document by following the said rails performing object detection on every window. The sliding window may slide a local window across the input image 104*a* and may identify at each location of the input image 104*a* whether the window contains any object. The object included in the input image 104*a* may be a mathematical expression/chemical expression. As a result, the object detection algorithm by utilising the sliding window may detect the presence of mathematical expressions/chemical equations inside the given input image 104*a*.

Furthermore, the object detection algorithm utilised for detecting the mathematical expressions/chemical equations inside the input image 104*a* may be defined as:

```
procedure EquationROIextraction(im), where im = content RGB image
im ← squarepad(im)
imthresh ← 255 for pix in imthresh if pix > 200 threshold image
imlines ← contours(imthresh)
for line in imlines do
  while i < length(line) do
  x,y ← line[i] - get point on line iteratively
  window ← CropByCenter(im,x,y) - get window having center on line
  rois ← SSD(window)
  for roi in rois do
    for edge in roi do
      while colour(im(edge)) = black do
        edge = adjust(edge) - move edge until there's no black pixel on edge
    rois ← MergeOverlap(rois)
    return rois
```

Figure 4:
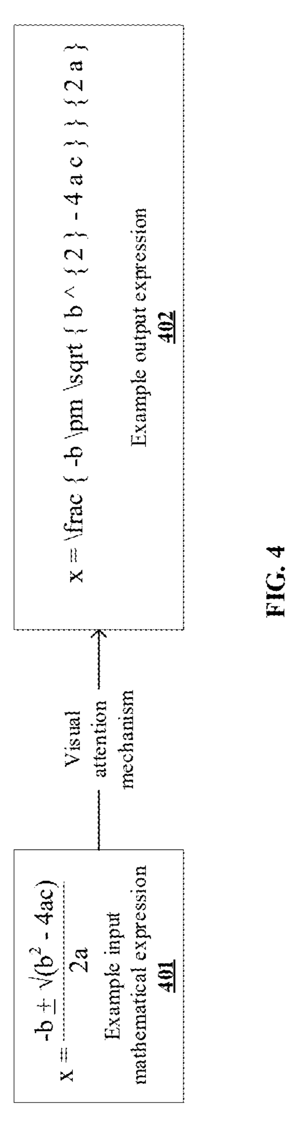
FIG. 4 illustrates an example of an input mathematical expression used to implement the method of digitising input characters.

Furthermore, the extracted mathematical expression/chemical equation from the input image 104*a* may be converted into their respective output string representations 107*a*, i.e., MathML and LaTeX respectively. FIG. 4 illustrates an example for an input mathematical expression 401. The digitising module 302, may implement the conversion of input mathematical expression 401 into an example output expression 402 by utilising a visual attention algorithm. The visual attention algorithm may consist of CNN 112 attached to a sequential autoencoder. The sequential autoencoder may be utilised to encode and generate high dimensional sequential data. The CNN 112 may generate a feature map from the example input mathematical expression 401, which may be then flattened and passed to the sequential autoencoder, which predicts the sequence of the example input mathematical expression 401 into the example output expression 402. The example output expression 402 may be represented in MathML sequence. The MathML sequence may consist of a number of Extensible Markup Language (XML) which may be used to mark up any equation in terms of its presentation and semantics. Further, the visual attention algorithm may visually inspect while generating the example input mathematical expression 401 and may recognise the equations as they are written in real-time.

Figure 5:
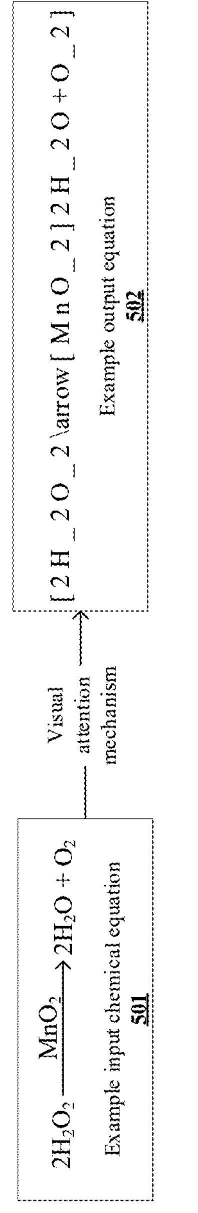
FIG. 5 illustrates an example of an input chemical equation used to implement the method of digitising input characters.

Similarly, FIG. 5 illustrates an example input chemical equation 501, that may be converted into an example output equation 502 by utilising a visual attention algorithm. Further, the example output equation 502 may be represented in a LaTeX sequence. LaTeX may be a document markup language that may be used to automatically generate symbols, equations, etc.

Further, the digitising module 302, may implement the Mathematical expression/Chemical equation conversion algorithm, defined as:

```
procedure Image-to-Markup(im) where im = equation RGB image
  imthresh ← 255 for pix in imthresh if pix > 200
  featureMap ← Densenet121(imthresh)
  encodings ← BahdanauAttention(featureMap,256)
  decodings ←AttentionDecoder(decodings, 120)
  i ←0
  for k in LatexEncodingsDictionary do - contains latex tokens
    lookup(i) = k
    i = i + 1
  for i = 0: length(decodings) do
    output = concat(output,lookup(i))
  return output
```

Furthermore, the visual attention algorithm that may be utilised for converting the example mathematical expression 401 and the example chemical equation 501, may use, in an exemplary embodiment, total of 8835 equation images rendered in Arial font and 8835 images of handwritten equations. Therefore, the visual attention algorithm may generalize over printed as well as handwritten equations with splendid accuracy.

Figure 6:
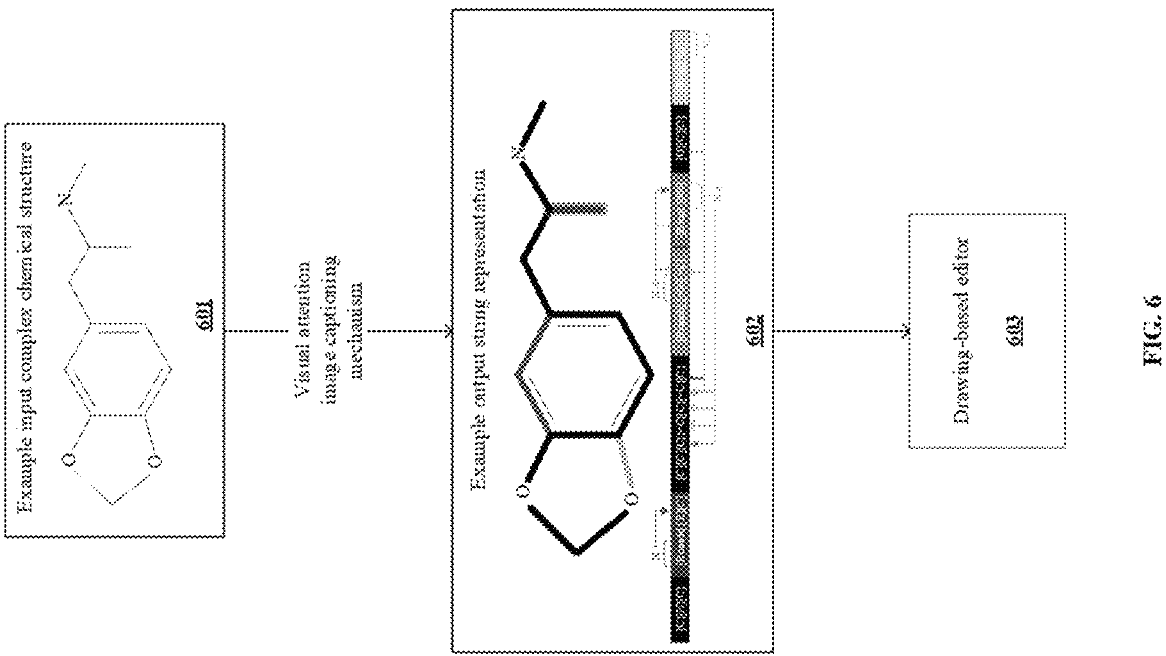
FIG. 6 illustrates an example of an input complex chemical structure used to implement the method of digitising input characters.

Further, the digitising module 302 may include a complex chemical structures function 304 that may recognise the complex chemical structures present inside the input image 104*a* by utilising a visual attention image captioning mechanism. FIG. 6 illustrates an example of input complex chemical structure 601 that may be used to implement the method of digitising input characters 104*b* from the input image 104*a* by the digitising module 302. The example input complex chemical structure 601 may be made up of rings, bonds, etc. Further, a visual attention image captioning mechanism may be utilised for predicting the sequence of the example input complex chemical structure 601. The visual attention image captioning mechanism may help to focus on the most relevant parts of the input image 104*a* for generating that word/structure in the input image 104*a* such as complex chemical structure 601. The visual attention image captioning mechanism may be utilised along with a string-based self-referencing function also known as Self Referencing Embedded Strings (SELFIES). SELFIES may essentially be a string-based output representation of the example input complex chemical structure 601. An example output string representation is illustrated in 602. The SELFIES may be tokenized to generate word embeddings that may be supported by CNN 112. Further, SELFIES may have a modular way of representing chemical structures as opposed to Simplified molecular-input line-entry system (SMILES) that may have scattered bits. Furthermore, SELFIES may recognise every molecule, information of branch, branch length as well as ring size. Moreover, SELFIES may not be restricted to molecular graphs but could be applied to other graph data types in natural science that have additional domain-dependent constraints.

In addition, a drawing-based editor 603 may be provided that may take SELFIES structure such as the output string representation 602 as input, renders the structure, and may provide the functionality to edit the structure 602. This not only makes the process of editing easier for academicians but also speeds up the digitisation process by magnitudes. The drawing-based editor 603 may provide a plethora of functionalities for drawing chemical structures such as rings, aromatic structures, bond lines, electrons, etc. may be easily edited and drawn by utilising the drawing-based editor 603.

Figure 7:
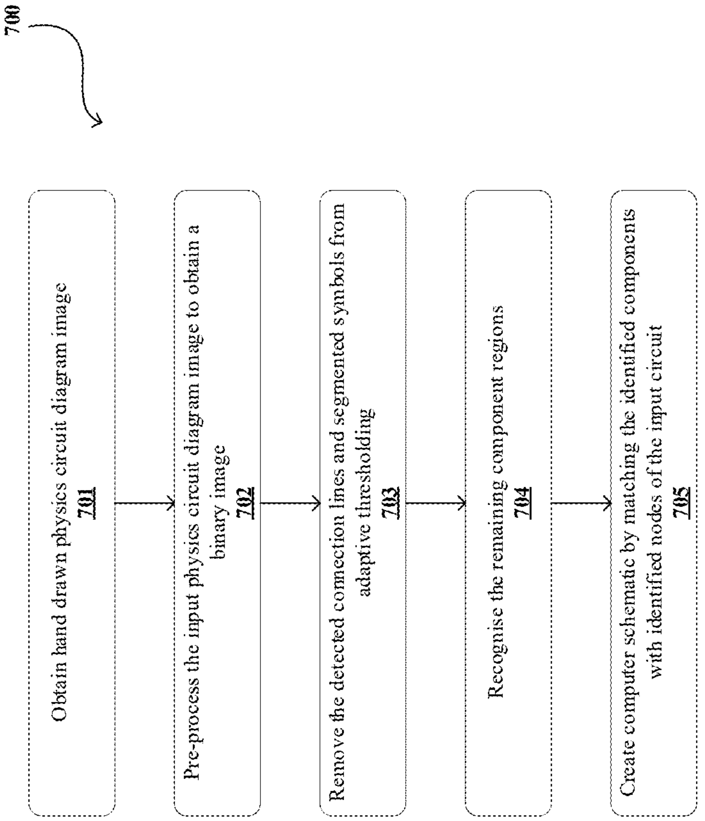
FIG. 7 depicts a process flow diagram of an embodiment to implement the method of digitising physics circuit diagrams.

Furthermore, the digitising module 302 may include a physics circuit diagrams function 305 that may recognise the physics circuit diagrams present inside the input image 104*a* by utilising image segmentation and classification algorithms. FIG. 7 illustrates a process flow 700 for recognising the physics circuit diagrams present inside the input image 104*a* implemented by the digitising module 302 that may be based on the image segmentation and classification algorithms. At step 701, the input image 104*a* including at least one hand drawn physics circuit diagram may be obtained (hereinafter referred as an input circuit image 104*a*).

At step 702, the input circuit image 104*a* at step 701 may be pre-processed to obtain a binary image. The binary image may be obtained using adaptive thresholding to reduce the effects of illumination changes on the input circuit image 104*a*. Further, a thinning operation may be applied to obtain a skeleton of the input circuit image 104*a*. The skeleton of the input circuit image 104*a* may detect endpoints of the input circuit image 104*a*. The endpoints may be the connecting points where the input circuit image 104*a* may contain various elements such as capacitor, voltage source, etc. may be connected.

Further, the endpoints of the input circuit image 104*a* may lead to the input circuit segment capacitor, voltage source, and ground symbols due to open lines present in these symbols. The symbols, i.e., capacitor, voltage source, and ground components may differ from each other in the two cases, the length ratio of lines, and the number of lines they have. The symbols may therefore be identified using the two cases. The capacitor has two lines with a length ratio of about 1, and the voltage source has two lines with a length ratio of about 0.5 and the Ground has a different number of lines than the other two components (Capacitor and Voltage source).

At step 703, the detected connection lines and segmented symbols, i.e., capacitor, voltage source, and ground components are removed from adaptive thresholding. Further, the remaining unidentified potential circuit components of the input circuit image 104*a* may be recognised in a Component recognition step 704.

At step 704, the remaining component regions such as a resistor, diode, or inductor components in the input circuit image 104*a* may be recognised. The remaining components may be classified using a Support Vector Machine (SVM) classifier that may classify remaining components in the input circuit image 104*a*. Further, HOG (Histograms of Oriented Gradients) features may be used to train the SVM classifier. The SVM classifier may interpret the feature vectors as a point in high dimensional space.

At step 705, a compute schematic of the input circuit image 104*a* may be created by matching the identified components with the identified node of the input circuit image 104*a*. The various nodes of the input circuit image 104*a* may be identified by using a node identification process. A contour finding algorithm may be applied to find each node as a region in the input circuit at step 701. The contour finding algorithm may be useful for shape analysis and object detection of the input circuit 701. The identified components using the steps in step 701-704 may be matched with the identified node to get the identified components with the nodes of the circuit and a computer schematic at step 705 is created.

The output string representation of the physics circuit diagram at step 701 may be represented as a Netlist sequence. The recognised physics circuit diagrams at step 701 may be further simulated to calculate the values for parameters such as voltage, current, resistance, etc.

According to another embodiment of the present disclosure, the system 100 may utilise a visual attention mechanism for performing the conversion tasks amalgamating distinct neural components from the domains of natural language processing and computer vision. The visual attention mechanism may initially create a feature map of the input image 104*a* by passing it through CNN 112. The image features may then be arranged into a grid and may be passed to a Recurrent Neural Network (RNN) for encoding. Further, an RNN decoder with a visual attention mechanism may use the encoded image features to decode them into a string sequence. The output string representation 107*a* may be a sequence of LaTeX, SELFIES, or netlist for mathematical expression/chemical equation, complex chemical structure, or physics circuit diagrams respectively.

Further, the output string representation 107*a* such as the LaTeX sequence may be generated sequentially by using the visual attention mechanism. The visual attention mechanism when generating the LaTeX sequences while looking at the input image 104*a* may understand how to map a generated LaTeX output to specific regions in the input image 104*a*.

Figure 8:
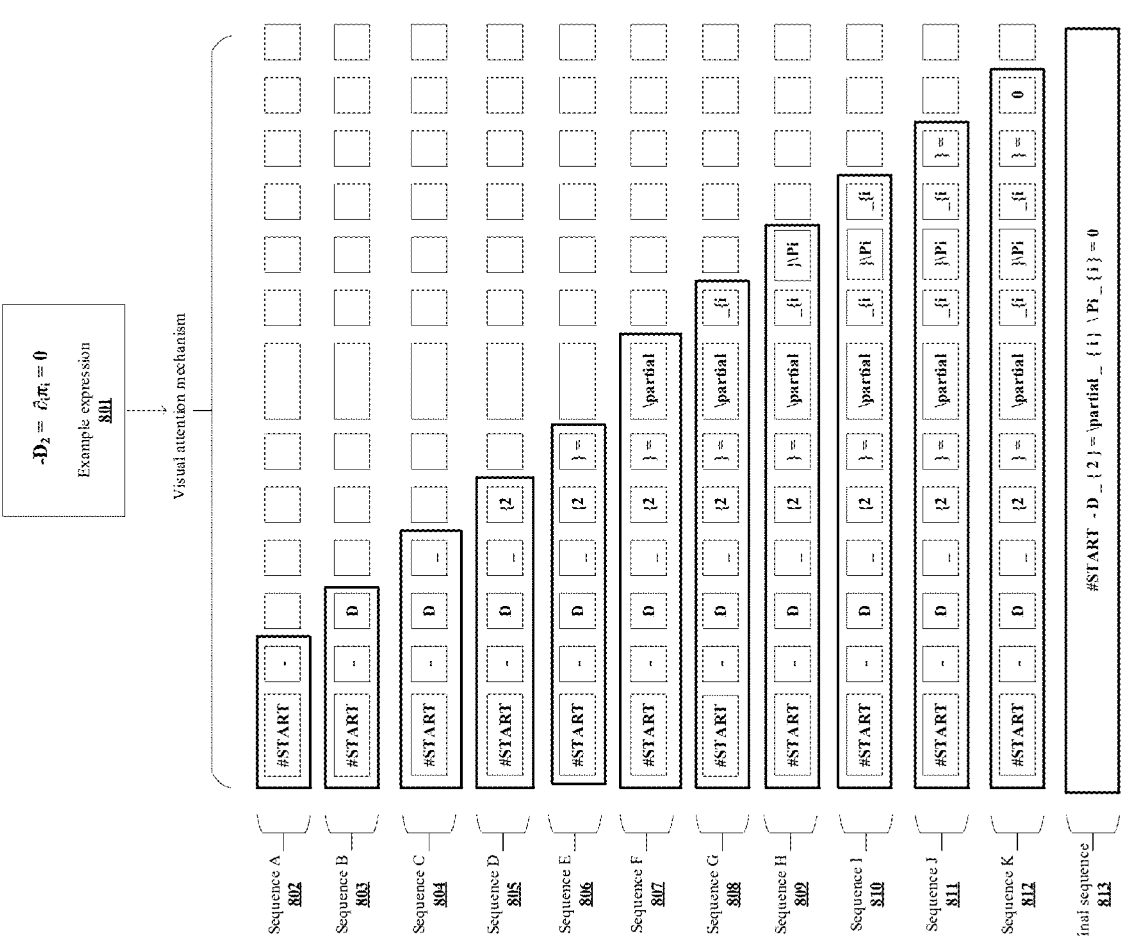
FIG. 8 depicts an illustration of an example expression for recognising output sequences using a visual attention mechanism.

FIG. 8 is a simplified illustration of a step by step recognition of an example expression 801 by using a visual attention mechanism. Sequence A in step 802 may illustrate the initial step for recognising the example expression 801. Sequence A may recognise the initial character of the example expression 801 by utilising a visual attention mechanism. The visual attention mechanism may use a CNN 112, that may understand and map the initial character of the example expression 801 into the LaTeX output sequence. Further, sequence B in step 803 may illustrate the recognition of the next character of the example expression 801. Similarly, sequence C to sequence K in steps 804 to 812 may recognise the characters of the example expression 801 corresponding to the previous sequences. Further, a final sequence in step 813 may be generated of the example expression 801 by utilising the visual attention mechanism. In this way, the output string representation of the example expression 801 may be extracted sequentially till the mapping of each specific character in the example expression 801 is completed. The sequential generation of the output string representation 107*a* using the visual attention mechanism may boost the system 100 performance, may help in debugging, and may also go a long way towards explainable deep learning systems.

The training of the whole visual attention mechanism may be performed in order to maximize the likelihood of the observed markup in its respective sequential order. The complete mechanism is trained end-to-end to maximize the likelihood of the observed training data. Apart from the supplied training data, the attention mechanism may not be exposed to any other information or metadata about the syntax and semantics of the process of generation of the markup language or its grammatical rules. Further, the mechanism may not only use highly varied and a plethora of styles during training but may also consist of transfer learning which may prove to be a good generalization technique for a variety of problems in the past.

Thus, the systems and methods for authoring and automatically digitizing one or more printed and handwritten content, including but not limited to mathematical expressions, chemical equations, complex chemical structure, and physics circuit diagrams, have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit(s), or by a combination thereof.

It is intended that the disclosure and examples be considered as exemplary only, with a true scope of disclosed embodiments being indicated by the following claims.

The invention claimed is:

1. A system for recognizing one or more handwritten characters, wherein the system comprising: camera or scanner, obtaining an input image including a plurality of input characters;

a pre-processing module operable to identify the received input image and further extract a plurality of input characters from the input image;

a digitizing module operatively connected to the pre-processing module, wherein the digitizing module being operable to digitize the plurality of input characters into a plurality of output string representations;

a post-processing module connected to the digitizing module, wherein the post-processing module being operable to combine the plurality of output string representations such as a mathematical expression, a chemical formula, a complex chemical structure, or a physics circuit diagrams;

an embedded editing module connected to the post-processor module of the system, wherein the embedded editing module being operable to allow one or more users to make corrections in the plurality of output string representations and further create new content; and wherein the system is formed on a Convolutional Neural Network (CNN) that is retrained iteratively based on the editing performed by the one or more users on the output string representations, wherein the iterative retraining continues for one in 2000 instances or less than or equal to a range of 0.01 percent to 0.05 percent until the incremental increase in the performance and reduction in the error rate;

wherein the attention mechanism comprising: generating the output string representations by mapping LaTeX (Lambert's Tex) sequences to one or more regions of the input image, wherein the regions are derived by generating a feature map from the input image that is passed to an autoencoder to predict the sequence of LaTeX tokens.

2. The system according to claim 1, wherein the system is based on an attention mechanism formed on the Convolutional Neural Network (CNN), representing the input image into the output string sequences.

3. The system according to claim 1, wherein the pre-processing module being operable to extract text and/or a plurality of characters such as the complex formulas, the mathematical expressions, the diagrams, the symbols, the ruled lines, the chemical equations, the structures, the physics circuits, and the like.

4. The system according to claim 1, wherein the digitizing module comprising:

digitizing the one or more mathematical expressions and the one or more chemical equations using the attention mechanism into the LaTeX sequences;

digitizing the one more complex chemical structures into the string-based self-referencing functions using the attention mechanism; and digitizing the one or more hand-drawn circuit diagrams such as circuits, flow charts, tables, and the like into the netlist sequences.

5. The system according to claim 1, wherein the output string representations are the string representation into the LaTeX, the self-referencing functions, or the netlist for the one or more mathematical expressions/the one or more chemical formulas, the one or more chemical structures, or the one or more physics circuits diagrams respectively.

6. The system according to claim 1, wherein the system is retrained iteratively using a data processing pipeline or workflow, wherein the data processing pipeline or workflow comprises a machine learning pipeline.

7. The system according to claim 1, wherein the system can be retrained iteratively, wherein the iterative retraining continues for one in 2000 instances or less than or equal to a range of 0.01 percent to 0.05 percent until the incremental increase in the performance and reduction in the error rate.

8. A method for recognizing one or more handwritten characters, wherein the method comprising:

sequential receiving of an input image including a plurality of input characters; extracting a plurality of input characters from the input image by a pre-processing module; digitizing a plurality of input characters into a plurality of output string representations, by a digitizing module;

combining the plurality of output string representations by a post-processing module, wherein the plurality of output string representations refers to a mathematical expression, a chemical formula, a complex chemical structure, or a physics circuit diagram s;

allowing one or more users to correct and further create new content in the plurality of output string representations using an embedded editing module; and wherein the method is formed on a Convolutional Neural Network (CNN) that is retrained iteratively based on the editing performed by the one or more users on the output string representations, wherein the iterative retraining continues for one in 2000 instances or less than or equal to a range of 0.01 percent to 0.05 percent until the incremental increase in the performance and reduction in the error rate;

wherein the attention mechanism comprising: generating the output string representations by mapping LaTeX (Lambert's Tex) sequences to one or more regions of the input image, wherein the regions are derived by generating a feature map from the input image that is passed to an autoencoder to predict the sequence of LaTeX tokens.

9. The method according to claim 8, wherein the digitizing module comprising:

digitizing the one or more mathematical expressions and the one or more chemical equations based on the attention mechanism, wherein the attention mechanism uses a Convolutional Neural Network (CNN) attached to a sequential autoencoder to link learned images to the predicted modeled LaTeX sequences;

digitizing the one or more complex chemical structures into string-based self-referencing functions using attention mechanisms that are tokenized to generate word embeddings; and digitizing the one or more hand-drawn circuit diagrams into netlist sequences to simulate the one or more drawn circuits and calculate values for parameters such as voltage, current, resistance, etc.

10. The method according to claim 8, wherein the one or more digitized complex chemical structures are edited using a drawing-based editor.

11. The method according to claim 8, wherein the output string representations are the string representation into the LaTeX, the self-referencing functions, or the netlist for the one or more mathematical expressions/the one or more chemical formulas, the one or more chemical structures, or the one or more physics circuits diagrams respectively.

12. The method according to claim 8, wherein the iterative retraining is performed using a data processing pipeline or workflow based on the editing performed by the users on the output string representations, wherein the editing made by the users are saved for a continual learning flow.

* * * * *